United States Patent
Breuer et al.

(10) Patent No.: US 10,793,180 B2
(45) Date of Patent: Oct. 6, 2020

(54) METHOD FOR PRODUCING A LENGTH-ADJUSTABLE STEERING SHAFT, AND LENGTH-ADJUSTABLE STEERING SHAFT

(71) Applicants: THYSSENKRUPP PRESTA AG, Eschen (LI); thyssenkrupp AG, Essen (DE)

(72) Inventors: Marius Breuer, Fishers, IN (US); Janick Durot, Widnau (CH); Paul Schwarzhans, Feldkirch (AT); Joachim Tuertscher, Feldkirch (AT); Robert Josef Maerk, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 47 days.

(21) Appl. No.: 16/324,269

(22) PCT Filed: Aug. 9, 2017

(86) PCT No.: PCT/EP2017/070221
§ 371 (c)(1),
(2) Date: Feb. 8, 2019

(87) PCT Pub. No.: WO2018/029265
PCT Pub. Date: Feb. 15, 2018

(65) Prior Publication Data
US 2019/0176869 A1   Jun. 13, 2019

(30) Foreign Application Priority Data
Aug. 11, 2016  (DE) .................. 10 2016 215 023

(51) Int. Cl.
*B62D 1/185*   (2006.01)
*F16C 3/03*   (2006.01)
(Continued)

(52) U.S. Cl.
CPC .......... *B62D 1/185* (2013.01); *B29C 45/0055* (2013.01); *B29C 45/14622* (2013.01);
(Continued)

(58) Field of Classification Search
CPC .. B62D 1/185; B62D 1/20; F16D 3/06; F16D 2250/0046; F16D 3/40; B29C 45/0055;
(Continued)

(56) References Cited

U.S. PATENT DOCUMENTS 5,575,501 A * 11/1996 Moriyama ............. B62D 1/192
                                                                 188/371
5,640,884 A * 6/1997 Fujiu ................. B29C 45/14491
                                                                 280/777
(Continued)

FOREIGN PATENT DOCUMENTS

DE  10 2008 040 782 A   2/2010
DE  10 2008 049 825 A   4/2010
(Continued)

OTHER PUBLICATIONS

English Translation of International Search Report issued in PCT/EP2017/070221, dated Oct. 31, 2017.

*Primary Examiner* — Darlene P Condra
(74) *Attorney, Agent, or Firm* — thyssenkrupp North America, LLC

(57) ABSTRACT

A method for producing a length-adjustable steering shaft having a hollow shaft in which a toothed shaft is received so as to be axially telescopic. The toothed shaft has a toothing with teeth on an external circumference that extend in the axial direction and which engages in a form-fitting manner in an inner toothing of the hollow shaft. A sliding layer of thermoplastic plastics material is at least in portions attached between the inner toothing and the toothing. In order to enable an improved fastening of the sliding layer to the (Continued)

toothing, prior to attaching the sliding layer, form-fitting elements which for forming a form-fitting connection that is effective in the axial direction are brought to engage with the sliding layer are configured in the region of the toothing of the toothed shaft or the inner toothing of the hollow shaft.

9 Claims, 4 Drawing Sheets

(51) Int. Cl.
*F16C 33/20* (2006.01)
*B62D 1/20* (2006.01)
*F16D 3/06* (2006.01)
*B29C 45/00* (2006.01)
*B29C 45/14* (2006.01)
*B29C 59/04* (2006.01)
*F16C 29/02* (2006.01)
*F16D 3/40* (2006.01)
*B29K 101/12* (2006.01)
*B29L 31/30* (2006.01)

(52) U.S. Cl.
CPC .............. *B29C 59/043* (2013.01); *B62D 1/20* (2013.01); *F16C 3/03* (2013.01); *F16C 33/208* (2013.01); *F16D 3/06* (2013.01); *B29K 2101/12* (2013.01); *B29L 2031/30* (2013.01); *F16C 29/02* (2013.01); *F16C 2326/01* (2013.01); *F16D 3/40* (2013.01); *F16D 2250/0046* (2013.01)

(58) Field of Classification Search
CPC ... B29C 45/14622; B29C 59/043; F16C 3/03; F16C 33/208; F16C 2326/01; F16C 29/02; B29K 2101/12; B29L 2031/30
See application file for complete search history.

(56) References Cited

U.S. PATENT DOCUMENTS

| | | | |
|---|---|---|---|
| 6,026,704 A * | 2/2000 | Shibata ............. | B29C 45/14491 280/777 |
| 7,198,425 B2 * | 4/2007 | Bergkvist ................ | B62D 1/20 403/109.3 |
| 7,736,083 B2 * | 6/2010 | Lescure ................. | F01D 5/026 403/359.1 |
| 2010/0307280 A1 * | 12/2010 | Schnitzer ............... | B62D 1/185 74/493 |
| 2013/0249145 A1 | 9/2013 | Okumura | |
| 2015/0210309 A1 * | 7/2015 | Kurokawa ............... | B62D 1/20 464/181 |
| 2017/0241472 A1 * | 8/2017 | Walser ................... | B21D 17/04 |
| 2017/0328400 A1 * | 11/2017 | Muntener ............. | B21D 15/02 |
| 2018/0283442 A1 * | 10/2018 | Brzezinski ............... | B62D 1/20 |

FOREIGN PATENT DOCUMENTS

| | | |
|---|---|---|
| DE | 102014105822 A | 10/2015 |
| DE | 102016203625 B | 3/2017 |
| GB | 2 316 150 A | 2/1998 |
| JP | 2005-240940 A | 9/2005 |
| WO | 2015162019 A | 10/2015 |
| WO | 2016082969 A | 6/2016 |

* cited by examiner

METHOD FOR PRODUCING A LENGTH-ADJUSTABLE STEERING SHAFT, AND LENGTH-ADJUSTABLE STEERING SHAFT

CROSS REFERENCE TO RELATED APPLICATIONS

This application is a U.S. National Stage Entry of International Patent Application Serial Number PCT/EP2017/070221, filed Aug. 9, 2017, which claims priority to German Patent Application No. DE 10 2016 215 023.5, filed Aug. 11, 2016, the entire contents of both of which are incorporated herein by reference.

FIELD

The present disclosure generally relates to a method for producing a length-adjustable steering shaft.

BACKGROUND

A telescopic steering shaft in the steering mechanism of a motor vehicle serves for transmitting the steering torque from the steering wheel to the steering gear is known, for example, from DE 10 2014 105 822 A1 or US 2015/0210309. In order for an adjustment of the steering wheel relative to the position of the driver to be enabled in the longitudinal direction, that is to say in the direction of the longitudinal axis, at least one shaft portion between the steering wheel and the steering gear is designed so as to be telescopic and thus length-adjustable. The length-adjustable shaft portion can form the driver-side steering spindle or the intermediate steering shaft between the steering spindle and the steering gear.

The steering shaft has a first shaft part, configured as a hollow shaft, having an inner toothing which has teeth that extend in the axial direction, and a second shaft part, configured as a toothed shaft, which is telescopic in said first shaft part and has an outer toothing which for transmitting torque engages in a form-fitting manner in the inner toothing and enables a telescope-type axial adjustment of the two shaft parts relative to one another.

A sliding layer is disposed between the toothing and the inner toothing which are composed of a metallic material, typically steel or an aluminum alloy. The sliding layer is composed of plastics material which is softer and more elastic than the metallic material of the toothings and which in the sliding contact with the metallic surfaces of the toothings has a lower frictional resistance. On account thereof, the rotational play is reduced, and the friction force that arises in the telescopic adjustment is minimized. This enables play-free precise steering and a comfortable, smooth and uniform longitudinal positioning of the steering wheel without any abrupt interferences (stick/slip effect). Moreover, the transmission of vibrations and the creation of noises is advantageously suppressed.

The sliding layer as a sliding coating by overmolding can be configured from thermoplastic plastics material, wherein the plastics material in the molten state is applied by an injection-molding method to the toothing so as to form a layer, as is described in DE 10 2014 105 822 A1 or U.S. 2015/0210309 mentioned. The sliding layer in this manner is connected in a force-fitting manner to the toothing. The sliding contact exists between the outer free surface of the plastics material layer which faces away from the force-fitting connection and which when adjusting is moved conjointly with the toothed shaft in the axial direction relative to the inner toothing of the hollow shaft.

The fixed connection between the sliding layer and the toothing, in the aforementioned prior art the force-fitting connection of the overmolded feature, by virtue of the forces that act when adjusting is stressed in the axial direction by shear forces. On account thereof, the sliding layer can be released from the toothing such that said sliding layer when adjusting is no longer entrained and can travel in an uncontrolled manner in the axial direction between the inner toothing and the toothing. In the worst-case scenario, the sliding layer can be pulled from the toothed shaft in the axial direction, this potentially leading to the adjustment being compromised.

Thus a need exists for a method which enables an improved fastening of the sliding layer to the toothing. Furthermore, a steering shaft having an improved attachment of the sliding layer is provided.

DETAILED DESCRIPTION

Figure 1:
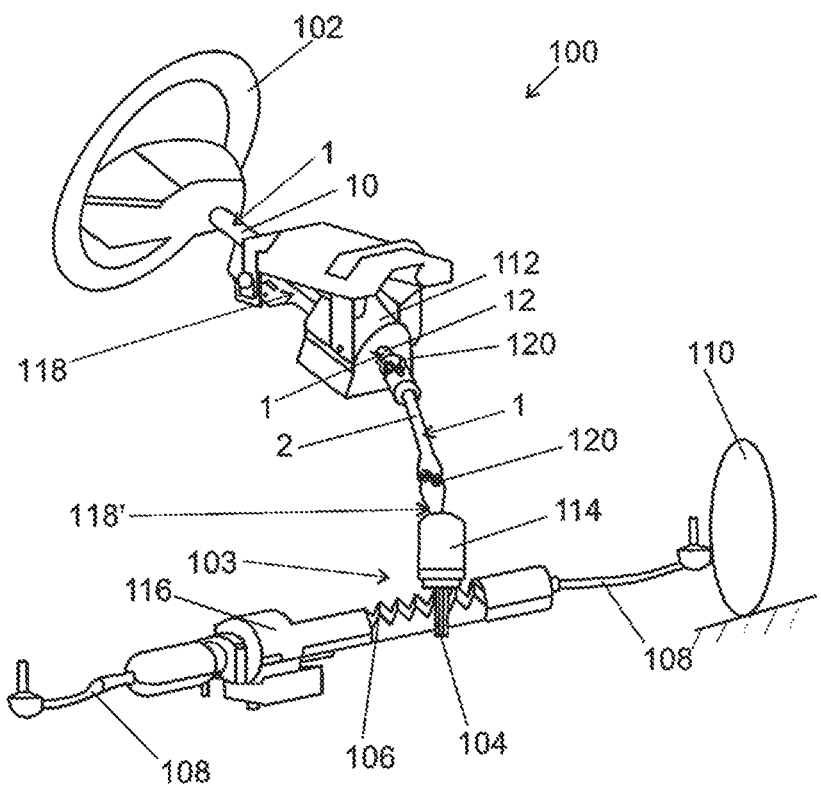
FIG. 1 is a schematic view of a motor vehicle steering mechanism.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a method for producing a length-adjustable steering shaft, comprising a hollow shaft in which a toothed shaft is received so as to be telescopic in the axial direction, said toothed shaft having a toothing which has teeth on the external circumference that extend in the axial direction and which engages in a form-fitting manner in an inner toothing of the hollow shaft, wherein a sliding layer from thermoplastic plastics material is at least in portions attached between the inner toothing and the toothing. A steering shaft produced by the method according to the invention is likewise the subject matter of the invention.

In some examples, prior to attaching the sliding layer, form-fitting elements which for forming a form-fitting connection that is effective in the axial direction are brought to engage with the sliding layer are configured in the region of the toothing of the toothed shaft or the inner toothing of the hollow shaft.

According to the invention, the surface in the region of the toothing of the toothed shaft or of the hollow shaft is provided with form-fitting elements which in the axial direction are supported in relation to corresponding form-fitting elements on the sliding layer. Form-fitting elements of this type that are effective in an axial manner can comprise, for example, elongate web-type, rib-type, or bead-type protrusions and/or flute-type or groove-type depressions which extend transversely to the axial direction, or else cupola-shaped protrusions or castellations, and/or trough-type or bowl-type depressions.

According to the method according to the invention, the surface is provided with the form-fitting elements prior to generating the fixed connection to the sliding layer. The form-fitting engagement with the sliding layer can be performed in a subsequent method step by forming the plastics material of the sliding layer into the form-fitting elements such that the plastics material of the sliding layer hugs the form-fitting elements and the form-fitting elements thus come to engage with the plastics material.

In the case of the invention, the form-fitting elements can be configured on the toothed shaft should the sliding layer be intended to be fixedly connected to the toothed shaft, as in the prior art cited above, wherein the sliding contact when adjusting exists between the inner toothing of the hollow shaft and the sliding layer. It is likewise possible that the form-fitting elements are configured in the hollow shaft so as to fix the sliding layer in the axial direction in the hollow shaft, such that the sliding contact exists between the toothing of the toothed shaft and the sliding layer.

The toothing of the toothed shaft is to be understood as an outer toothing.

The sliding layer can be formed by a sliding coating from thermoplastic plastics material by way of which the toothing or the inner toothing is overmolded. In the case of overmolding, as is described in the prior art cited above, the toothing including the form-fitting elements in the injection-molding method is enclosed by molten plastics material such that the form-fitting elements after solidification are embedded in the plastics material body of the sliding layer. The sliding layer configured as a sliding coating becomes a fixedly connected component part of the toothed shaft or hollow shaft. According to the invention, a substance-to-substance bonded and form-fitting connection that has a particularly high load-bearing capability is configured between the toothing and the sliding layer.

The sliding layer can alternatively be formed by a sliding sleeve which is inserted in the axial direction between the toothing and the inner toothing, wherein the form-fitting elements are plastically formed in the sliding sleeve. The sliding layer herein can be implemented by a sliding sleeve which is initially produced separately, for example from plastics material by the injection-molding method or extrusion method. The dimensions and the shape of said sliding sleeve are adapted such that the sliding sleeve as far as possible without play or by way of undersize under radial elastic pretensioning in the axial direction can be press-fitted onto the toothing of the toothed shaft, or by way of oversize can be press-fitted into the inner toothing of the hollow shaft such that a force-fitting seat of the sliding sleeve on the teeth is generated. The form-fitting elements according to the invention are then formed into the seating face of the sliding sleeve that bears in a force-fitting manner. This can already be performed by the elastic forces that are exerted by the sliding sleeve per se when being press-fitted to a tight fit. Alternatively or additionally, a contact force can subsequently be applied from the outside onto the free sliding face of the sliding sleeve such that the form-fitting elements are plastically press-fitted while forming a form-fitting engagement in the plastics material of the sliding sleeve. The external contact force in the manufacturing of a length-adjustable steering shaft can preferably be exerted in that the sliding sleeve in the form-fitting axial insertion of the toothed shaft into the hollow shaft is coaxially compressed between the toothing and the inner toothing. To this end, the toothed shaft is provided with the form-fitting elements, and the sliding sleeve is axially attached to the region that is provided with the form-fitting elements. The toothed shaft conjointly with the sliding sleeve is subsequently inserted in the axial direction into the hollow shaft, wherein a force which presses the sliding sleeve from the outside radially against the toothed shaft is exerted on the sliding face from the outside by way of the inner toothing. The form-fitting elements herein are entrenched in the plastics material and cause the sliding sleeve to be fixedly connected to the toothed shaft by way of the form-fitting connection generated herein, thus forming the sliding layer according to the invention. Alternatively, it is possible that the form-fitting elements are configured in the region of the inner toothing of the hollow shaft. The sliding sleeve in this instance is first inserted in the axial direction into the inner toothing, and the sliding sleeve when axially inserting the toothed shaft is subsequently pressed from the inside against the form-fitting elements such that a sliding layer that is fixedly connected to the hollow shaft is implemented, the toothed shaft being mounted so as to be axially telescopic in said sliding layer.

It can alternatively be provided that the sliding sleeve after attaching and positioning on the toothed shaft, or after incorporating and positioning the sliding sleeve in the hollow shaft, respectively, thermal energy is introduced and the sliding sleeve is heated such that the latter hugs the form-fitting elements and the form-fit between the sliding sleeve and the form-fitting elements is thus configured.

It can be provided that the form-fitting elements are configured as a profiled feature having a plurality of elevations and/or depressions that are mutually spaced apart in the axial direction. The profiled feature can have a plurality of preceding elevations, for example in the form of the above-mentioned protrusions, or of depressions that are formed into the surface, as has been described above, or elevations and depressions disposed in an alternating manner. The profiled feature formed in this manner from a multiplicity of elevations and/or depressions can preferably extend across a portion of planar expanse in the region of the toothing or inner toothing. It is advantageous herein that a reliable form-fitting engagement in the sliding layer is guaranteed in the surface area of the profiled feature, said reliable form-fitting engagement on account of the planar expanse guaranteeing a reliable and uniform transmission of force in the axial direction, on account of which a tight seat of the sliding layer on the toothing or in the inner toothing is guaranteed.

The form-fitting elements which can be designed as a profiled feature are preferably configured on or in the tooth surfaces, preferably on the tooth flanks of the teeth of the toothing or the inner toothing. On account thereof, the adhesion of the sliding layer on the toothing can be increased without additional fastening means such as, for example, counter bearings, detents, or the like having to be provided outside the teeth which could disadvantageously weaken the toothing or enlarge the installation space. A particularly strong adhesion of the sliding layer in the lateral regions of the teeth that are particularly stressed when in operation is guaranteed herein according to the invention. It is additionally advantageous herein that the sliding layer on account of the torque transmitted by way of the tooth flanks when steering is pressed against the form-fitting elements according to the invention, on account of which the form-fitting connection when in operation is additionally reliably held in engagement. Additionally or alternatively, the form-fitting elements can be configured on the tooth tips and/or in the intermediate regions in the circumferential direction between the teeth.

In the implementation of the method it is advantageous that the form-fitting elements are plastically formed in the surface of the toothing or the inner toothing. Methods for the plastic deformation of material generate depressions by locally impressing tools at a high pressure. The material that is plastically displaced here in forms elevations that are accumulated so as to neighbor the depressions such that a profiled feature in planar continuous manner is generated.

The form-fitting elements are preferably rolled into the surface by means of rotating profiled rollers which roll in the axial direction on the surface of the toothing, for example by roller-burnishing or knurling. Methods of this type, known per se, for cold forming enable an effective and economical production. The surface is additionally reinforced in a localized manner, on account of which the load bearing capability and the durability is increased. In order for the form-fitting elements to be formed therein, the toothed shaft or the hollow shaft can be moved in the axial direction through between profiled rollers that are preferably mutually opposite. A profiled feature in the form of a knurling can be embossed, that is to say cold-formed, in the corresponding surfaces in an efficient continuous method by way of the profiled rollers that are configured as roller-burnishing or knurling rollers. During the forming of the form-fitting elements the profiled rollers preferably have a mutually fixed and non-variable axial spacing. The knurling can be expanded in a planar manner, for example beyond the flanks of the teeth, and can have elevations and depressions that are disposed in an alternating manner. Elongate elevations and depressions that for forming a simple knurling are disposed so as to be mutually parallel can be provided, or else a cross knurling having elevations and depressions that are disposed in a cruciform manner can be provided. The form-fitting engagement can be adapted to the respective material properties by way of the specific design embodiment of the knurling in terms of the depth and the shape of the formed features, as well as the mutual spacing of the formed features. A continuous durable form-fitting connection to the sliding layer that is capable of bearing loads is achieved by way of the knurled face.

The depth of the form-fitting elements can preferably be 10% to 40% of the material thickness of the sliding layer. On account thereof, the form-fitting elements and the sliding layer can mutually engage in a form-fitting manner while providing an improved transmission of force. In the case of the sliding layer having dissimilar material thicknesses, the material thickness in the region in which the sliding layer interacts with the form-fitting elements, that is in which the form-fitting elements engage in the sliding layer, is relevant to the design of the depth of the form-fitting elements. The depth of the form-fitting elements, for example of a knurling, can preferably be between 0.05 mm and 0.30 mm. It is ensured on account thereof that no functional impediment to the toothing is created by the incorporation of the form-fitting elements according to the invention. Moreover, an economical generation of the form-fitting elements by means of non-subtractive cold-forming, for example by roller-burnishing, knurling, or embossing, can be performed.

A length-adjustable steering shaft according to the invention comprises a hollow shaft in which a toothed shaft is received to as to be telescopic in the axial direction, said toothed shaft having a toothing which has teeth on the external circumference that extend in the axial direction and which engages in a form-fitting manner in an inner toothing of the hollow shaft, wherein a sliding layer from thermoplastic plastics material is at least in portions attached between the inner toothing and the toothing. In order for the fastening of the sliding layer to the toothing to be improved, it is proposed according to the invention that form-fitting elements which for forming a form-fitting connection that is effective in the axial direction engage with the sliding layer are configured in the region of the toothing of the toothed shaft or the inner toothing of the hollow shaft.

The production of the steering shaft is preferably performed according to the above-described method. It is advantageous herein that the form-fitting elements comprise a profiled feature having a plurality of elevations and/or depressions that are mutually spaced apart in the axial direction, said elevations and/or depressions preferably being disposed so as to be equidistant.

The sliding layer can be configured as an overmolding which is applied to the toothing by the injection-molding method and is connected in a force-fitting manner to said toothing. Alternatively, the sliding layer can be configured as a sliding sleeve which is made as a separate part and in a subsequent step is inserted between the hollow shaft and the toothed shaft. In any case, the form-fitting elements for forming a form-fitting connection that is effective in the axial direction engage in the sliding layer.

Identical parts are at all times provided with the same reference signs in the various figures, and are therefore typically also identified or mentioned, respectively, just once.

A motor vehicle steering mechanism 100 is schematically illustrated in FIG. 1, wherein a driver by way of a steering wheel 102 can manually introduce a steering torque (steering moment) as a steering command into a steering shaft 1. The steering movement by way of the steering shaft 1 is transmitted to a steering pinion 104 which meshes with a rack 106 which in turn by way of a displacement of the tie rods 108 transmits the predefined steering angle to the steerable wheels 110 of a motor vehicle (not illustrated).

An electric auxiliary force assistance can be provided in the form of an auxiliary force assistance 112 that is coupled to the steering shaft 1 at the input side, of an auxiliary force assistance 114 that is coupled to the pinion 104, and/or of an axillary force assistance 116 which is coupled to the rack 106. The respective auxiliary force assistance 112, 114, or 116 couples an auxiliary torque into the steering shaft 1 and/or the steering pinion 104 and/or an auxiliary force into the rack 106, on account of which the driver is assisted in the operation of the steering mechanism. The three different auxiliary force assistance systems 112, 114, and 116 illustrated in FIG. 1 show potential positions for the disposal of said systems.

Only one single position of the shown positions is usually occupied by an auxiliary force assistance 112, 114 or 116. The auxiliary torque, or the auxiliary force, respectively, which is to be applied for assisting the driver by means of the respective auxiliary force assistance 112, 114, or 116 is determined while taking into account a steering moment introduced by the driver, said steering moment being determined by a torque sensor 118. Alternatively to, or in combination with, the introduction of the auxiliary torque, an additional steering angle can be introduced into the steering system by the auxiliary force assistance 112, 114, 116 said additional steering angle being added to the steering angle applied by the driver by way of the steering wheel 102.

The steering shaft 1 on the input side has an input shaft 10 that is connected to the steering wheel 102, and on the output side has an output shaft 12 that by way of the steering pinion 104 is connected to the rack 106. The input shaft 10 and the output shaft 12 are coupled to one another in a rotation-elastic manner by way of torsion bar (not to be seen in FIG. 1). A torque that is introduced by a driver by way of the steering wheel 102 into the input shaft 10 thus always leads to a rotation of the input shaft 10 relative to the output shaft 12 when the output shaft 12 does not rotate in an exactly synchronous manner in relation to the input shaft 10. This relative rotation between the input shaft 10 and the output shaft 12 can be measured by way of a rotation angle sensor, and a respective input torque relative to the output shaft 12 can be determined in a corresponding manner by virtue of the known torsional rigidity of the torsion bar. The torque sensor 118 is configured in this way by determining the relative rotation between the input shaft 10 and the output shaft 12. Such a torque sensor 118 is known in principle and be implemented by an electromagnetic sensor assembly, for example, as will be described hereunder, or by another measurement of the relative twisting.

Accordingly, a steering moment which by the driver is applied by way of the steering wheel 102 to the steering shaft 1, or the input shaft 10, respectively, will cause the introduction of an auxiliary torque by one of the auxiliary force assistance systems 112, 114, 116 only when the output shaft 12 is twisted relative to the input shaft 10 counter to the rotational resistance of the torsion bar.

The torque sensor 118 can alternatively also be disposed at the position 118' wherein in this instance the separation of the steering shaft 1 is present in the input shaft 10 and the output shaft 12 and the rotation-elastic coupling by way of the torsion bar is accordingly present at another position so as to be able to determine a relative rotation and thus in a corresponding manner an input torque and/or an auxiliary torque to be introduced from the relative twisting of the output shaft 12 that by way of the torsion bar is coupled to the input shaft 10.

The steering shaft 1 according to FIG. 1 furthermore comprises at least one cardan joint 120, by means of which the profile of the steering shaft 1 in the motor vehicle can be adapted to the spatial conditions. The intermediate steering shaft of the steering shaft 1, which in the example illustrated is disposed between two cardan joints 120 and connects the output shaft 12 to the pinion 104 of the steering gear 103, is configured according to the invention as a length-adjustable steering shaft 2.

Figure 2:
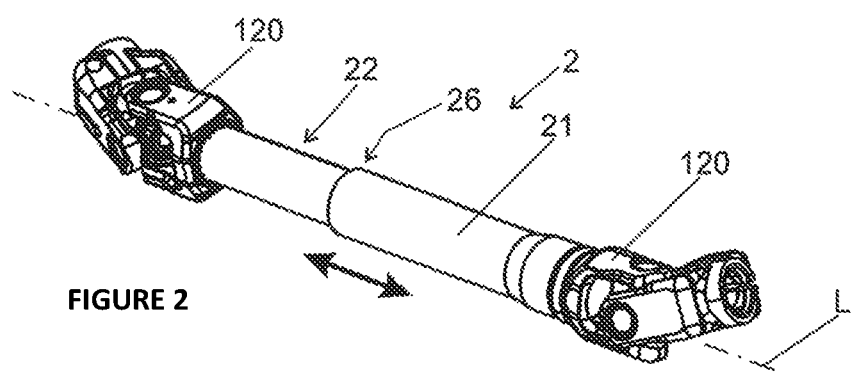
FIG. 2 is a perspective view of a steering shaft.

FIG. 2 shows a perspective view of the steering shaft 2 in the assembled state.

The steering shaft 2 comprises a hollow shaft 21 and a toothed shaft 22. The toothed shaft 22 has a toothing 23 having a plurality of teeth 24 which are disposed on the external circumference and which extend in the direction of the longitudinal axis L, that is to say extend axially across the length V of the toothing 23. The hollow shaft 21 and the toothed shaft 22 on the joint-side end thereof have in each case one joint yoke 121.

Figure 3:
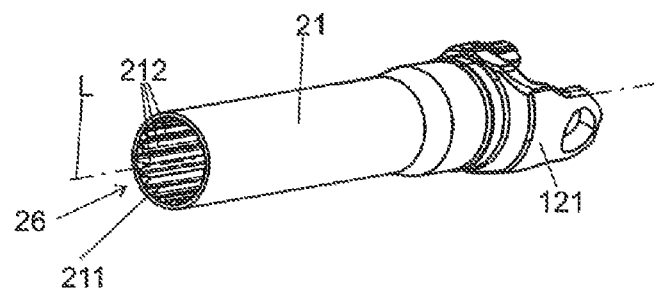
FIG. 3 is a perspective view of the hollow shaft of the steering shaft according to FIG. 2.

The hollow shaft 21 which is illustrated in a perspective view in FIG. 3 has a receptacle opening 26 which is open toward the toothed shaft 22 and in which an inner toothing 211 having teeth 212 is configured, the toothed shaft 22 being receivable in said inner toothing 211 in the axial direction, that is to say in the direction of the longitudinal axis L. In order for a torque-fitting connection to be established, the toothed shaft 22 by way of the free end thereof is introduced in the axial direction, that is to say in the direction of the longitudinal axis L, into the receptacle opening 26 of the hollow shaft 21 such that the assembled state illustrated in FIG. 2 is achieved, wherein on account of the mutual engagement of the teeth 24 and 212 and the interconnection of the sliding coating 5 a connection that is form-fitting in relation to the rotation about the longitudinal axis L is generated. The toothed shaft 22 and the hollow shaft 21 in this assembled state can be moved axially relative to one another in the direction of the longitudinal axis L in order for spacing differences to be equalized, as is indicated by the double arrow in FIG. 2.

Figure 5:
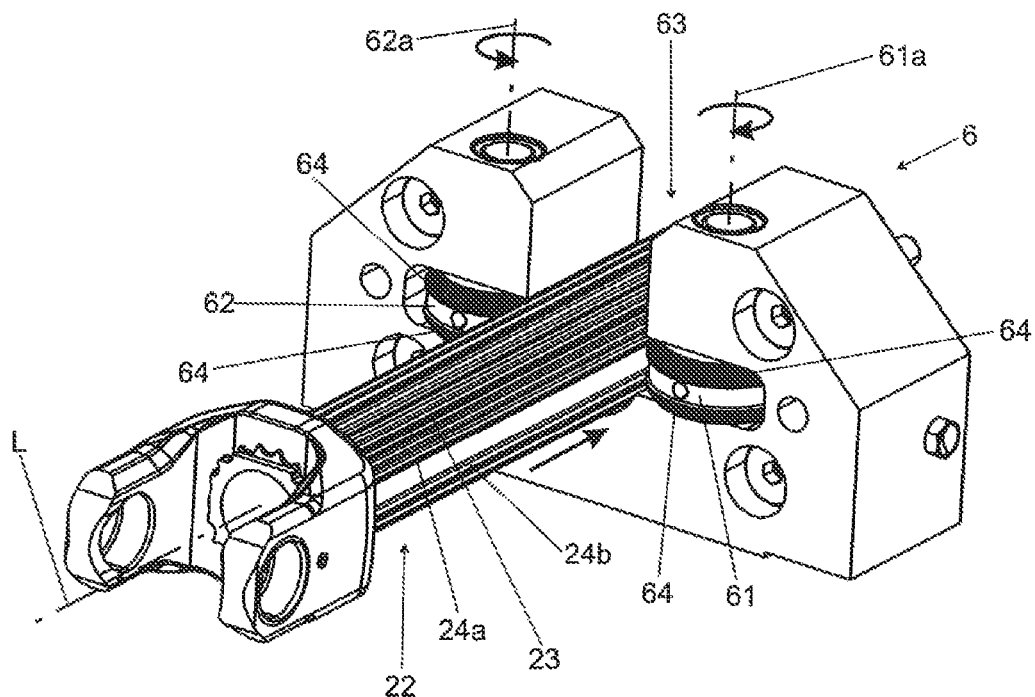
FIG. 5 is a perspective view of a toothed shaft during the forming of form-fitting elements therein by means of a roller-burnishing device.
Figure 6:
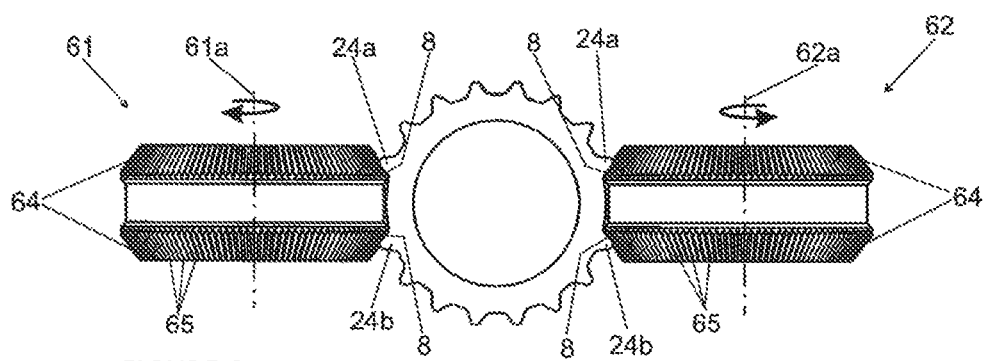
FIG. 6 is a view onto the roller-burnishing device according to FIG. 5 in the axial direction.

A roller-burnishing device 6 which comprises two roller-burnishing rollers 61 and 62 is illustrated in FIGS. 5 and 6. The roller-burnishing rollers 61 and 62 can freely rotate about the rotation axes 61a and 62a. The rotation axes 61a and 62a are disposed so as to be mutually parallel and mutually spaced apart such that a machining passage 63 which passes through perpendicularly between the rotation axes 61a and 62a remains vacant between the external circumferential faces of the roller-burnishing rollers 61 and 62. The rotation axes 61a and 62a have a fixed and non-variable mutual spacing.

The roller burnishing rollers 61 and 62 on the circumferential faces thereof that are mutually opposite in the machining passage have in each case two encircling knurled profiles 64 which on the conical shell faces thereof that are mutually inclined and inclined in relation to the rotation axes 61a and 62a have a multiplicity of knurled teeth 65. The roller-burnishing rollers 61 and 62 at least in the region of the knurled profiles 64 are composed of a hard material, for example hard metal or hardened tool steel, which is significantly harder than the material of the toothed shaft 22.

In order for the method according to the invention to be carried out, a toothed shaft 22 by way of the free end thereof is introduced in the direction of the longitudinal axis L into the machining passage 63 between the roller-burnishing rollers 61 and 62, as is shown in FIG. 5, on account of which the roller-burnishing rollers 61 and 62 are set in counterrotation on account of the introduction of the toothed shaft. The spacing of the roller-burnishing rollers 61 and 62 is dimensioned such that the knurled profiles 64 by way of a predefined machining pressure are pressed against the flanks of the neighboring teeth 24a and 24b, said flanks being mutually opposite in the circumferential direction, as can be derived from FIG. 6. The toothing 23 of the toothed shaft 22, on account of the advancing movement of the toothed shaft 22 in the direction of the longitudinal axis L, is moved into the machining passage 63 of the roller-burnishing device 6. The knurled profiles 64 herein roll on the flanks of the teeth 24a and 24b, and the knurled teeth 65 by way of plastic cold-forming are formed in the surfaces of the teeth 24a and 24b. On account thereof, a knurling 8 that in the direction of the longitudinal axis L is at least continuous across part of the length V is formed on the flanks of the teeth 24a and 24b, said knurling 8 forming a profiled feature that in a planar manner extends on the flanks of the teeth 24a and 24b, having depressions 81 and therebetween accumulated elevations 82 which are alternatingly formed in the direction of the longitudinal axis L. The depressions 81 and the elevations 82 extend in each case transversely to the longitudinal axis L, thus enabling the generation of a form-fitting connection that is effective in the axial direction.

The advancing movement can be understood as both a displacement of the toothed shaft 22 in the direction of the longitudinal axis with and without a reversal of direction. It is thus possible for the toothed shaft 22 to be provided both with a continuous knurling 8 which extends across the entire length of the toothing 23, as well as with a partial knurling 8, in that a reversal of direction of the movement of the toothed shaft 22 from the roller-burnishing device 6 sets in when a predefined length of the knurling 8 has been reached.

As an alternative to an advancing movement of the toothed shaft 22 into the roller-burnishing device 6, it can be provided that the roller-burnishing rollers 61 and 62 are capable of being driven in a counterrotating manner by means of a motorized drive, wherein the toothing 23 is drawn into the machining passage 63 of the roller-burnishing device in the direction of the longitudinal axis L.

Figure 7:
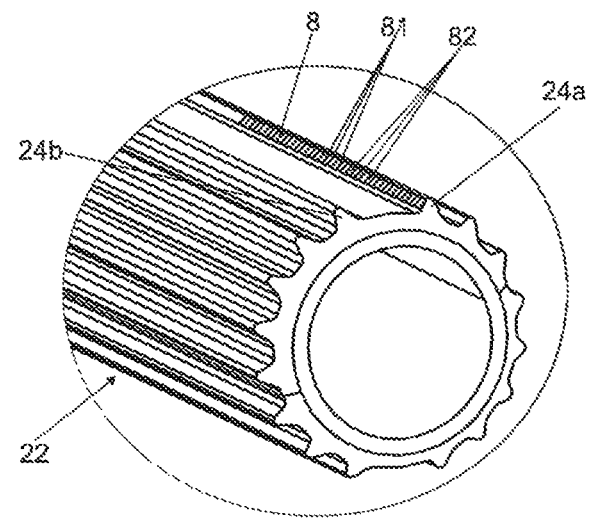
FIG. 7 is a detailed view of a toothed shaft after roller-burnishing.
Figure 8:
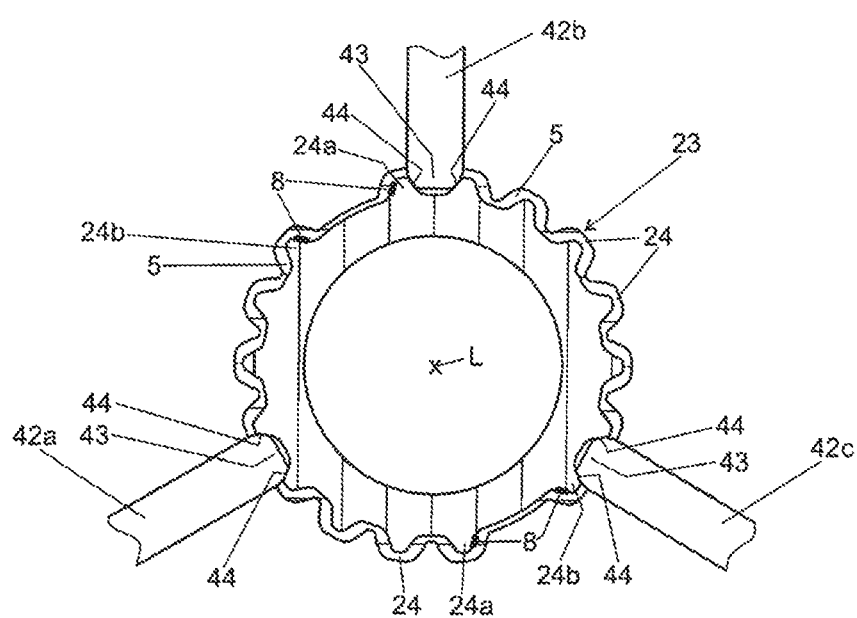
FIG. 8 is an enlarged cross-sectional view of a toothed shaft according to FIG. 7, clamped in an injection-molding tool.

FIG. 7 shows the toothed shaft 22 in the partially finished state prior to applying a sliding layer 5 which in the example shown is embodied as a plastics material overmolding. The toothed shaft is preferably composed of metal, preferably of steel or an aluminum alloy. The teeth 24 in the region of the toothing 23 are overmolded with plastics material by the injection-molding method.

Figure 9:
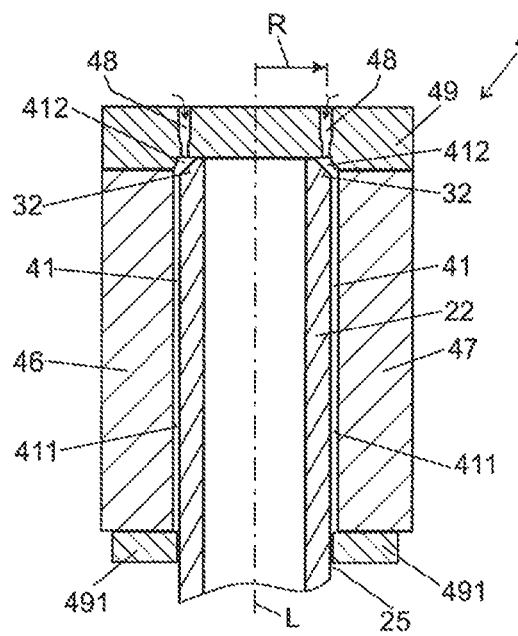
FIG. 9 is a longitudinal sectional view through an injection-molding tool in the closed state, prior to the injection of plastics material.
Figure 10:
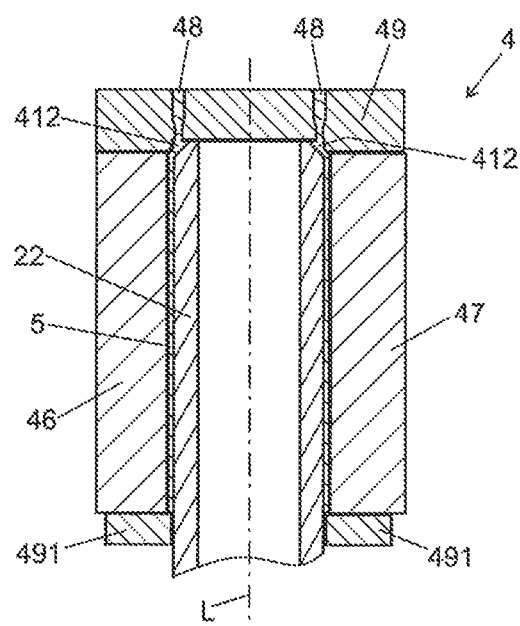
FIG. 10 is a longitudinal sectional view through the injection-molding tool according to FIG. 8, in the closed state, after the injection of plastics material.
Figure 11:
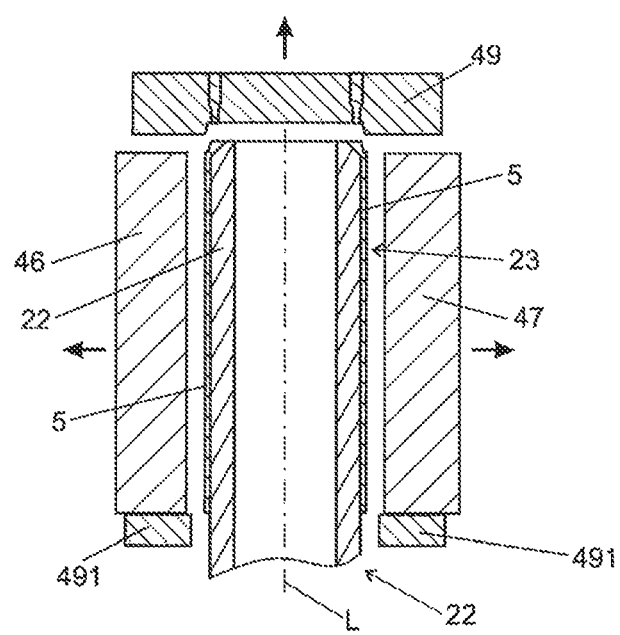
FIG. 11 is a longitudinal sectional view through an injection-molding tool according to FIG. 9 in the demolded (opened) state.

When overmolding, the toothed shaft 22 is clamped between positioning elements 42a, 42b, and 42c, so as to be concentric with the longitudinal axis L. The disposal of the positioning elements 42a, 42b, and 42c is schematically shown in FIG. 7, wherein the remaining injection mold 4, which is shown in FIGS. 9, 10, and 11, is omitted for the sake of better clarity.

The positioning elements 42a, 42b, and 42c are configured so as to be pin-shaped, in the example illustrated having a rectangular or square cross section, respectively, the dimension of the latter in the direction of the longitudinal axis L being only a fraction of the length V of the toothing 23. In the example shown, the three positioning elements 42a, 42b, and 42c are disposed so as to be uniformly distributed across the circumference and by way of the free ends 43 thereof are directed radially inward toward the longitudinal axis L such that the toothed shaft 22 between the free ends 43 is clamped so as to be centric in a mold cavity 41 and coaxial relative to the longitudinal axis L, as can be derived from FIG. 9. The toothed shaft 22 in the injection mold 4 in the region of the toothing 23 is surrounded by the mold face 411 that delimits the teeth 24, that is to say that said mold face 411 forms the negative impression of the toothing 23. The mold face 411 is likewise oriented so as to be coaxial with the longitudinal axis L. This arrangement can be seen in detail in the enlarged illustration of FIG. 7.

The positioning elements 42a, 42b, and 42c, in the region of the free ends 43 thereof, have positioning faces 44. The positioning faces 44 are disposed such that the latter come into contact with the in the circumferential direction mutually facing tooth flanks of neighboring teeth 24. On account thereof, the positioning elements 42a, 42b, and 42c by way of the positioning faces 44 can engage in each case in a form-fitting manner from the outside between two neighboring teeth 24. On account thereof, the toothed shaft 22 on account of the positioning elements 42a, 42b, and 42c is clamped so as to be orientated at a precise angle in relation to a rotation about the longitudinal axis L, and so as to be centered, within the mold cavity 41. The positioning faces 44 interact with that tooth flank of the respective neighboring tooth 24 that faces the positioning element 42a, 42b, and 42c.

In order for the toothed shaft 22 to be able to be clamped within the mold cavity 41, the positioning elements 42a, 42b, and 42c are in each case attached to a slide 46 which is configured in the manner of a segment and is radially movable relative to the longitudinal axis L.

Slides 47 which are likewise configured in the manner of segments are disposed in the circumferential direction between the slides 46, said slides 47 for demolding being able to be diverged in a collision-free manner conjointly with the slides 46 radially in relation to the longitudinal axis L.

When the slides 46 and 47 are radially diverged, a toothed shaft 22 can be introduced into the injection mold 4. The slides 46 and 47 are subsequently converged in the radially inward direction, wherein the toothed shaft 22 in the mold cavity 41 is clamped so as to be centered and oriented in angular terms between the positioning faces 44 of the positioning elements 42a, 42b, and 42c, as has been described above. The injection mold 4, on account of the converging slides 46 and 47, is simultaneously closed, wherein the mold face 411 is closed in the circumferential direction.

FIGS. 9, 10, and 11 show in each case a longitudinal section along the longitudinal axis L through an injection mold 4, specifically in the closed state prior to injecting, that is to say non-filled (FIG. 9), in a state filled with plastics material (FIG. 10), and in the open state for demolding (FIG. 11).

The injection mold 4 has segment-shaped slides 46 and 47 which in a star-shaped manner are disposed about the longitudinal axis L and by way of their radially inside mold faces 411 delimit the mold cavity 41 which surrounds the toothed shaft 22 in the region of the toothing 23. The mold cavity 41 at the free end of the toothed shaft 22, at the top in FIGS. 9 to 11, is closed by an end wall 49 which, as is illustrated, at the end side bears on the toothed shaft 22. The mold cavity 41 at a spacing from the free end is closed by a further end wall 491. The further end wall 491 can also be referred to as a sealing slide. Said end wall 491 is preferably configured in the manner of a segment and in a star-shaped manner can be diverged in a radially outward manner such that the toothed shaft 22 can be placed into the injection mold 4, or the toothed shaft 22 overmolded with the sliding layer 5 can be retrieved after overmolding, respectively. The end wall 491 during the overmolding delimits the flow of the plastics material melt in the direction of the longitudinal axis L.

Figure 4:
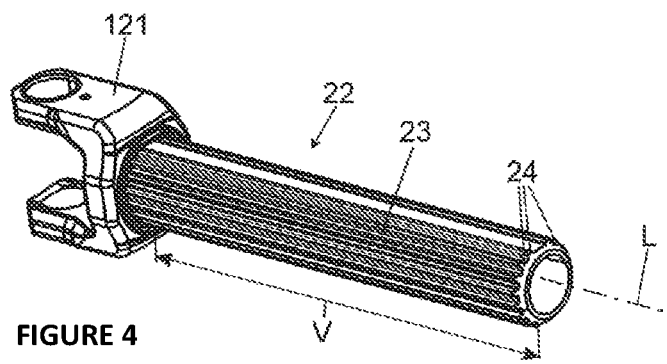
FIG. 4 is a perspective view of the toothed shaft of the steering shaft according to FIG. 2.

The toothed shaft 22 on the free end thereof has an encircling chamfer 32 which can also be seen in FIG. 4. A continuously annular sprue space 412 which is open toward the mold cavity 41 is formed between said chamfer 32 and the end wall 49. The injection points 48 in the end wall 49 are disposed on a circle having the radius R which is coaxial with the longitudinal axis L, specifically preferably at identical angular mutual spacings, such that said injection points discharge into the sprue space 412 at the end side. Consequently, a molten thermoplastic plastics material can be injected through the injection points 48 in the axial direction into the sprue space 412, as is indicated by the arrows in FIG. 9. The sprue space 412 forms the axial end region of the mold cavity 41; accordingly, the injection of the plastics material is performed according to the invention from the axial end region of the mold cavity 41, the latter by way of the dimensions thereof defining the wall thickness of the plastics material overmolding 5 which forms the sliding coating. The axial end region is preferably disposed in the region of the end side of the toothed shaft 22.

The plastics material injected through the injection points 48 first fills the sprue space 412 and subsequently, by way of a uniform compact flow front that fills the mold cavity 41, that is coaxially annular with the longitudinal axis L, across the entire circumference thereof, moves in the axial direction along the toothing 23 until the opposite end wall 491 has been reached. This filled state in which the mold cavity 41 is completely filled with plastics material such that, in other words, the mold cavity 41 is completely filled with the plastics material overmolding that forms the sliding layer 5 is illustrated in FIG. 10.

After cooling down, the finished toothed shaft 22 can be demolded, this being illustrated in FIG. 10. After the cooling and solidification of the sliding layer 5, the slides 46 and 47 for demolding are diverged in a star-shaped radially outward manner, and the end wall 48 is moved in the axial direction away from the free end of the toothed shaft 22, as is indicated in FIG. 9 by the radial and axial arrows. The completely overmolded toothed shaft 22 can then be retrieved from the injection mold 4.

In the case of the overmolding described above, molten plastics material is applied by the injection-molding method to the surface of the toothing 23 and after cooling down is connected in a force-fitting manner to the surface of the teeth 24, 24*a*, and 24*b*. The depressions 81 and elevations 82 of the knurling 8 herein are likewise completely filled with plastics material such that said depressions 81 and elevations 82 after cooling down are embedded in a form-fitting manner in the plastics material of the sliding layer 5. On account thereof, in addition to the form-fitting connection by overmolding described in the prior art, a form-fitting connection that is effective in the axial direction is implemented upstream of overmolding by the configuration of form-fitting elements in the form a knurling 8. On account thereof, the retention and the load-bearing capability of the sliding layer 5 in the axial direction is improved, and a release from the toothed shaft 22 is effectively prevented.

LIST OF REFERENCE SIGNS

1 Steering shaft
10 Input shaft
12 Output shaft
100 Motor vehicle steering mechanism
102 Steering wheel
103 Steering gear
104 Steering pinion
106 Rack
108 Tie rod
110 Steerable wheel
112,114,116 Auxiliary force assistance
118, 118' Torque sensor
120 Joint
121 Joint yoke
2 Length-adjustable steering shaft
21 Hollow shaft
211 Inner toothing
212 Teeth
22 Toothed shaft
23 Toothing
24, 24*a*, 24*b* Teeth
26 Receptacle opening
32 Chamfer
4 Injection mold/injection-molding tool
41 Molding cavity
411 Mold face
412 Sprue space
42*a*,*b*,*c* Positioning element
43 Free end
44 Positioning faces
46, 47 Slide
48 Injection point
49, 491 End wall
6 Roller-burnishing device
61, 62 Roller-burnishing rollers
61*a*, 62*a* Rotation axes
63 Machining passage
64 Knurled profiles
65 Knurled teeth
8 Knurling
81 Depressions
82 Elevations
5 Plastics material overmolding
L Longitudinal axis
V Length of toothed region
R Radius

What is claimed is:

1. A method for producing a length-adjustable steering shaft having a hollow shaft in which a toothed shaft is received so as to be telescopic in an axial direction, the toothed shaft having a toothing which has teeth on the external circumference that extend in the axial direction and which engages in a form-fitting manner in an inner toothing of the hollow shaft, wherein a sliding layer of thermoplastic plastics material is at least in portions attached between the inner toothing and the toothing, the method comprising:
    forming, in the region of the toothing of the toothed shaft or the inner toothing of the hollow shaft, form-fitting elements configured to provide a form-fitting connection effective in the axial direction, wherein the form-fitting elements are plastically formed in a surface of the toothing or of the inner toothing, wherein the form-fitting elements are rolled into the surface by means of rotating profiled rollers which roll in the axial direction on the surface of the toothing;
    bringing the form-fitting elements into engagement with the sliding layer; and
    attaching the sliding layer.

2. The method of claim 1, wherein the form-fitting elements are configured as a profiled feature having a plurality of elevations and/or depressions that are mutually spaced apart in the axial direction.

3. The method of claim 1, wherein the sliding layer is formed by a sliding coating from thermoplastic plastics material by way of which the toothing or the inner toothing is overmolded.

4. The method of claim 1, wherein the sliding layer is formed by a sliding sleeve which is inserted in the axial direction between the toothing and the inner toothing.

5. The method of claim 1, wherein the depth of the form-fitting elements is 10% to 40% of the material thickness of the sliding layer.

6. A length-adjustable steering shaft, comprising:
a hollow shaft including an inner toothing;
a toothed shaft received in the hollow shaft so as to be telescopic in an axial direction, said toothed shaft having a toothing which has teeth on the external circumference that extend in the axial direction and which engages in a form-fitting manner in the inner toothing;
a sliding layer of thermoplastic plastics material is at least in portions attached between the inner toothing and the toothing; and
form-fitting elements formed in the region of the toothing of the toothed shaft or the inner toothing of the hollow shaft configured as a form-fitting connection effective in the axial direction and engaged with the sliding layer, wherein the form-fitting elements comprise a profiled feature having a plurality of elevations and/or depressions that are mutually spaced apart in the axial direction.

7. The steering shaft of claim 6, wherein the sliding layer is configured as an overmolding.

8. The steering shaft of claim 6, wherein sliding layer is configured as a sliding sleeve.

9. A method for producing a length-adjustable steering shaft having a hollow shaft in which a toothed shaft is received so as to be telescopic in an axial direction, the toothed shaft having a toothing which has teeth on the external circumference that extend in the axial direction and which engages in a form-fitting manner in an inner toothing of the hollow shaft, wherein a sliding layer of thermoplastic plastics material is at least in portions attached between the inner toothing and the toothing, the method comprising:
forming, in the region of the toothing of the toothed shaft or the inner toothing of the hollow shaft, form-fitting elements configured to provide a form-fitting connection effective in the axial direction, wherein the form-fitting elements are configured as a profiled feature having a plurality of elevations and/or depressions that are mutually spaced apart in the axial direction;
bringing the form-fitting elements into engagement with the sliding layer; and
attaching the sliding layer.

* * * * *